Patented May 29, 1945

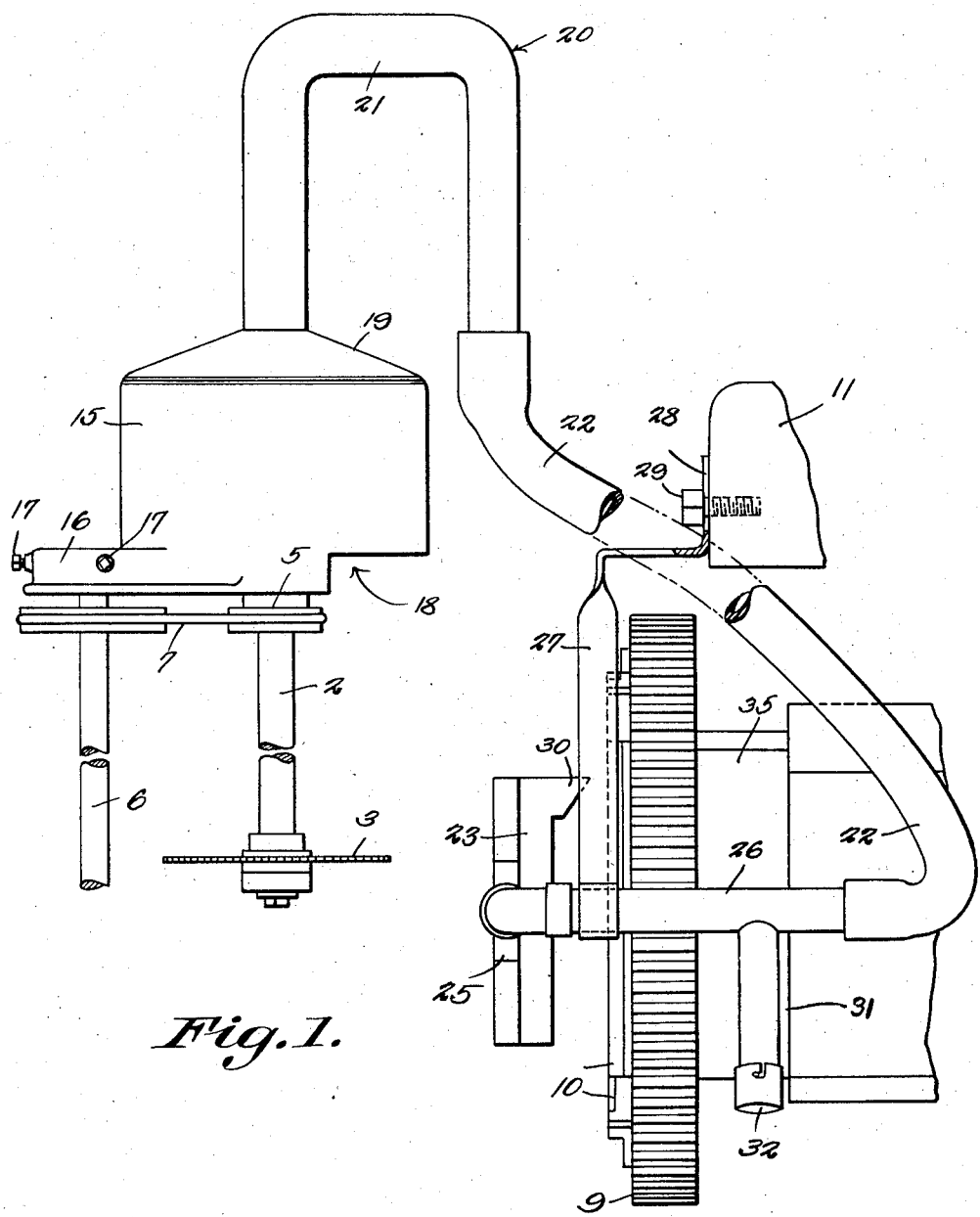

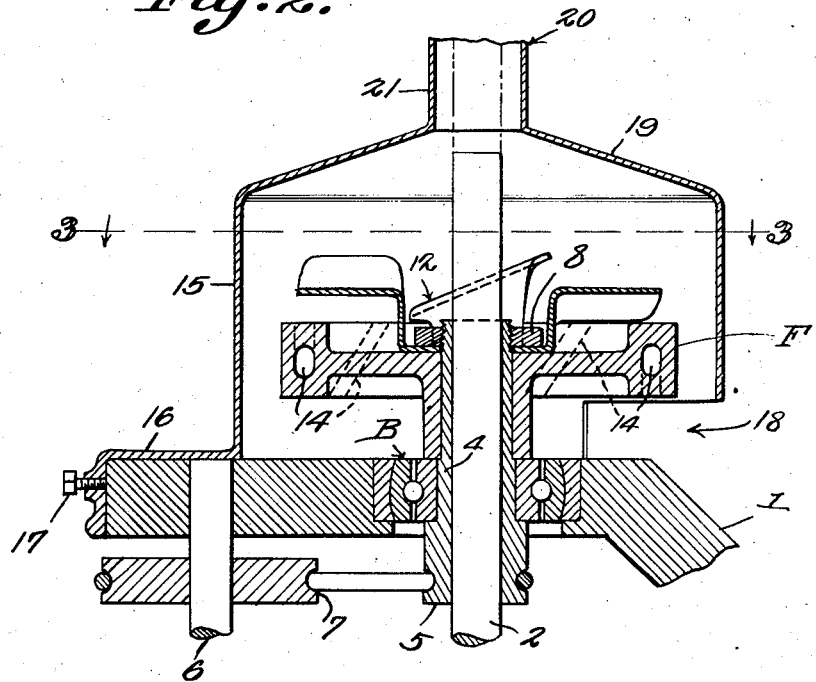

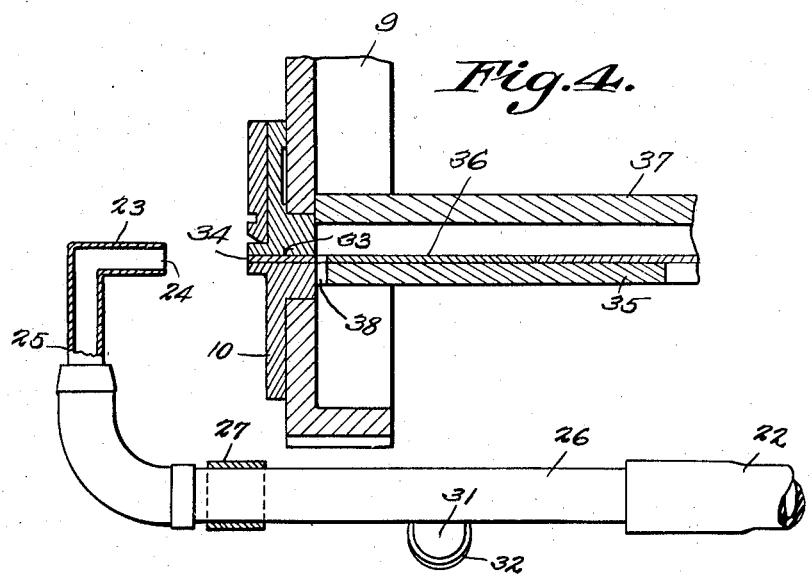

2,377,075

UNITED STATES PATENT OFFICE 2,377,075

LINOTYPE MACHINE ACCESSORY

Dexter B. Ellis, Ogden, Utah

Application December 2, 1943, Serial No. 512,627

7 Claims. (Cl. 199—56)

The device forming the subject matter of this application is an accessory for a Linotype machine, the general object in view being to discharge a current of cooling air through the slug chamber of a mold on a mold wheel.

Another object of the invention is to supply a simple but effective means whereby an air draft may be created, not by a separate driving means, but by taking advantage of a part already known in a Linotype machine, to wit, the slug saw shaft and attendant members, to drive a fan which creates the air draft.

Another object is to govern the air supply by causing the saw shaft to serve as an automatic throttle, cooperating with the air conduit.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 is an elevation showing a device of the class described, assembled with the cooperating parts of a Linotype machine;

Fig. 2 is a vertical section taken through parts of the known machine and showing a portion of the invention;

Fig. 3 is a transverse section on the line 3—3 of Fig. 2;

Fig. 4 is a sectional view of the mold wheel, a portion of the air conduit being shown;

Fig. 5 is a sectional view disclosing a portion of the conduit, of the mold wheel and of the ejector mechanism; and Fig. 6 is a section on the line 6—6 of Fig. 5.

The device forming the subject matter of this application is adapted to be used with Linotype machines which include, preferably but not necessarily, improvements in printing slug sawing devices of the sort invented by Charles L. Mohr, of Chicago, and shown, for example, and with sufficient detail, in his United States Patent No. 1,355,241, of October 12, 1920.

In Fig. 2, the numeral 1 marks a portion of a housing, a rotatable and vertically movable shaft 2 being mounted in the housing and carrying a slug saw 3 (Fig. 1). In the housing 1 is located an anti-friction bearing B. A sleeve 4 is secured to the shaft 2 and terminates at its lower end in a pulley 5, deriving rotation from a power driven shaft 6, mounted to rotate in the housing 1, the shafts 6 and 2 being operatively connected by a belt and pulley drive 7. The hub of a fly wheel F is held by a nut 8 upon the inner member of the ball bearing B and against a shoulder on the sleeve 4, the fly wheel, therefore, being connected to the shaft 2, for rotation therewith.

The nut 8 holds an up-blast fan 12 on the fly wheel F, for rotation therewith, and in order that the fly wheel may supplement the fan as an air-propelling means, the wheel is provided adjacent its periphery with openings 14 which extend entirely through the wheel, the longitudinal axis of each of the openings being oblique to a plane at right angles to the axis of rotation of the wheel.

The mold wheel is shown at 9 and carries a mold 10, the mold chamber appearing at 33, and a slug at 34. The numeral 35 marks the right hand guide plate for the ejector blade 36, the left hand guide plate being shown at 37. In the end of the guide plate 35, which has close contact with the back of the mold 10, a plurality of notches or openings 38 are formed. The invention proposes to force cooling air through the mold chamber 33, and the notches 38 form outlets for the air, when impelled by a means to be described hereinafter.

The customary casing (not shown) for the fly wheel F is removed, and its place is taken by a specially constructed, inverted cup-shaped casing 15, having an offset 16 which is secured to the housing 1 by attaching elements 17, such as set screws. Near its lower end, the casing 15 is provided with a side opening 18. The opening 18 is an air inlet for the casing 15, and the opening permits an operator to give the fly wheel F a hand-turn if the slug saw 3 becomes bogged in the work, or if for any other reason, a manual rotation of the shaft 2 is desired.

The casing 15 is equipped with an upwardly tapered top 19, to the apex of which an air conduit 20 is connected. The air conduit 20 includes an inverted, rigid, U-shaped pipe 21, one arm of which is connected to the tapered top 19 of the casing 15. For convenience in assembling the air conduit 20 with a Linotype machine, the conduit comprises a flexible tube 22, connected to the other arm of the pipe 21.

The numeral 23 marks an elongated, box-like discharge head, made of metal if desired and open at its inner side, as shown at 24, the open side of the discharge head being disposed close to the mold chamber 33, to project air thereinto. The discharge head 23 is provided with a lateral, tapered neck 25, to which is connected a laterally and backwardly extended, rigid pipe 26, the flexible tube 22 being connected to the pipe.

A hanger 27 is supplied, and the lower end of the hanger is engaged about the pipe 26, to support the head 23 and adjacent parts. The hanger 27 has a slot 28 in its upper end, the slot receiving a machine screw 29 or other securing device, engaging any accessible portion 11 of the Linotype machine and holding the hanger 27 thereon, for vertical adjustment, so that the discharge head 23 may be positioned properly with respect to the mold chamber 33. It may here be noted that the discharge head 23 is supplied at its upper end with a projecting hood 30, extended toward the mold wheel 9 and facilitating discharge of the air into the mold chamber 33 after the slug 34 has been ejected.

With a view to collecting dust that may be produced by the slug saw 3, the pipe 26 which forms part of the air conduit 20 is supplied with a depending, tubular receptacle 31, carrying at its lower end a detachable closure 32.

In practical operation, when the shaft 2 is rotated, the fan 12 and the inclined openings 14 in the fly wheel F create an updraft through the opening 18, and air is forced through the conduit 20, and through the head 23, into the mold chamber 33, the air finding an exit through the outlet ports 38 of the right hand guide plate 35, the molds thus being cooled. As the air proceeds through the conduit 20, the dust in the air tends to gravitate into the receptacle 31, where it is collected, to the benefit of the health of the operator of the machine and others in its vicinity.

The reasons for cooling the slug molds 10 are understood by those skilled in the art, and may be alluded to briefly. If an ordinary operator is turning out short, reading-column slugs, for example, he can finger the keyboard fast enough to cause the molten metal to over-heat the mold 10, but if longer lines are being produced, containing more characters, the operator cannot compose as many lines in the same time. Consequently, the machine casts fewer lines during a given period, and less air is required to cool the slug mold. The air supply is automatically governed in the device forming the subject matter of this invention.

When long lines are being composed, the upper portion of the saw shaft 2 advances into the conduit 20, as shown in dotted lines in Fig. 2, and regulates the air supply. When a Mohr saw is attached to a type-setting machine, all slugs cast are of the same length, represented by the full capacity of the mold chamber 33. The saw 3 cuts the slug to any length of line desired. To illustrate: when the operator sets the saw gauge (not shown) for a two-inch line (the usual width of a news column line of type), the saw will automatically cut off four inches of blank slug. The operator cannot finger the keyboard fast enough to keep the machine running at full capacity on lines longer than three inches. Thus, fewer type slugs are cast per minute, and less cooling is required.

What is claimed is:

1. A Linotype machine comprising a mold wheel, a mold carried by the mold wheel and having a slug-forming chamber, a shaft supported for rotation, a slug cutter carried by the shaft, an air impeller driven by the shaft, an air conduit receiving air from the impeller and discharging through the chamber, a fly wheel secured to the shaft and giving uniformity to the operation of the slug cutter, the fly wheel having openings therethrough, the openings being disposed obliquely with respect to a plane at right angles to the axis of rotation of the fly wheel.

2. A Linotype machine comprising a mold wheel, a mold carried by the mold wheel and having a slug-forming chamber, a shaft supported for rotation, a slug cutter carried by the shaft, an air impeller driven by the shaft, an air conduit receiving air from the impeller and discharging through the chamber, a fly wheel secured to the shaft and giving uniformity to the operation of the slug cutter, the impeller comprising a blast fan secured to the shaft, outwardly of the fly wheel, the fly wheel having openings therethrough, the openings being disposed obliquely with respect to a plane at right angles to the axis of rotation of the fly wheel, the fly wheel and its openings constituting an air-impelling means supplemental to the fan.

3. A Linotype machine comprising a mold wheel, a mold carried by the mold wheel and having a slug-forming chamber, a shaft supported for rotation, an air impeller driven by the shaft, a casing about the impeller and having an opening so located as to receive dust-laden air proceeding from the cutter, a conduit connected to the casing and discharging air through the chamber, and means interposed in the conduit for collecting dust as dust-laden air passes through the conduit.

4. A Linotype machine constructed as set forth in claim 3, and wherein the last-specified means comprises a dust receptacle depending from the conduit and having its upper end in communication with the conduit.

5. A Linotype machine comprising a mold wheel, a mold carried by the mold wheel and having a slug-forming chamber, a shaft supported for rotation, an air impeller driven by the shaft, an air conduit receiving air from the impeller and discharging through the chamber, a guiding means including a front plate and terminating close to the mold, and an ejector movable in the guiding means and cooperating with the chamber to expel a slug therefrom, the front plate having a vent constituting an air outlet for the chamber.

6. A Linotype machine constructed as set forth in claim 5, and wherein the guiding means comprises front and rear plates, the front plate being provided, in its end adjacent to the mold, with a plurality of transversely-spaced notches which form the aforesaid outlet.

7. A Linotype machine comprising a mold wheel, a mold carried by the mold wheel and having a slug-forming chamber, a shaft, a slug cutter carried by the shaft, an air impeller carried by the shaft, an air conduit receiving air from the impeller and discharging through the chamber, and means for mounting the shaft for rotation, thereby to operate the cutter and the impeller, and for longitudinal movement, whereby the shaft may obstruct the conduit variably and govern the flow of air therethrough.

DEXTER B. ELLIS.